United States Patent [19]
Davis et al.

[11] Patent Number: 5,701,705
[45] Date of Patent: Dec. 30, 1997

[54] PREFABRICATED MODULAR PORTABLE LIVESTOCK SHELTER

[75] Inventors: Richard L. Davis; Philip G. Balch, both of Topeka, Kans.

[73] Assignee: Land Resource Associates, Topeka, Kans.

[21] Appl. No.: 687,639

[22] Filed: Jul. 26, 1996

[51] Int. Cl.$^6$ ................................................ E04B 1/346
[52] U.S. Cl. ...................... 52/68; 119/446; 119/473; 119/499; 52/143
[58] Field of Search .................. 52/68, 143, 169.9, 52/DIG. 14; 135/117, 128, 151, 908, 121, 152, 153, 157; 119/416, 436, 444, 445, 446, 473, 498, 499, 496

[56] References Cited

U.S. PATENT DOCUMENTS

| | | | |
|---|---|---|---|
| 68,937 | 9/1867 | Baker et al. | 119/16 |
| 74,411 | 2/1868 | Norris | 119/16 |
| 142,069 | 8/1873 | Yeiser | 119/16 |
| 176,677 | 4/1876 | Patterson | 119/16 |
| 291,625 | 1/1884 | Robbins | 119/16 |
| 624,330 | 5/1899 | Heaton | 119/16 |
| 1,439,157 | 12/1922 | Ford | 119/446 |
| 1,743,603 | 1/1930 | Heizenreter | 119/16 |
| 1,823,940 | 9/1931 | Hoegermeyer | 119/16 |
| 2,712,677 | 7/1955 | Hyde | 119/16 |
| 2,954,007 | 9/1960 | Mitchell | 119/499 |
| 2,954,260 | 9/1960 | Wright | 52/68 X |
| 3,023,723 | 3/1962 | Everett | 119/16 |
| 3,416,496 | 12/1968 | Peterson | 119/446 |
| 3,556,054 | 1/1971 | Honegger et al. | 119/16 |
| 3,724,424 | 4/1973 | Benjamin | 119/16 |
| 3,885,524 | 5/1975 | Gregory | 119/16 |
| 4,222,347 | 9/1980 | Bunger | 119/436 |
| 4,231,289 | 11/1980 | Domicent | 135/117 X |
| 4,322,925 | 4/1982 | Geisler | 119/16 |
| 4,372,251 | 2/1983 | Keith | 119/16 |
| 4,508,060 | 4/1985 | Schulte | 119/16 |
| 4,726,154 | 2/1988 | Raptis et al. | 119/436 X |
| 4,793,286 | 12/1988 | Buxton | 119/498 |
| 4,991,895 | 2/1991 | Artbo | 119/16 |
| 5,584,311 | 12/1996 | Schaefer | 135/128 |

*Primary Examiner*—Lanna Mai

[57] ABSTRACT

A prefabricated modular portable livestock shelter shipped unassembled includes a pair of end walls 22 and 24 attached to a side wall 26. In addition a roof 28 is attached to the end walls 22 and 24, and the side wall 26. The end walls 22 and 24 are connected by a front tubular side rail 30, a back tubular side rail 32, and a pair of tubular skids 34 by means of a tubular connector 36 and tubular connector fastener 38. Upturned ends 40 allow the shelter to slide easily over the surface of the ground. The shelter is secured by placing metal earth anchors 42 into the ground and fastening them to the shelter with a steel cable and clamp 44. The shelter can be configured in the winter to provide protection from wind while allowing exposure to sun. The summer configuration provides additional shade while allowing breeze to pass through the structure. A tractor or other suitable farm vehicle may fasten a chain to the metallic hooks 46 in order to drag the portable livestock shelter 20 over the ground to facilitate pasture, manure, and disease management. The structure can be disassembled to move from one location to another.

3 Claims, 7 Drawing Sheets

PREFABRICATED MODULAR PORTABLE LIVESTOCK SHELTER

BACKGROUND

1. Field of Invention

Livestock producers typically rely on riparian areas to provide a reliable source of water and shelter for livestock. These areas next to streams frequently provide sufficient natural vegetation to provide protection from wind in the winter and shade in the summer. Increasing emphasis on water quality protection is placing a priority on locating livestock away from streams to protect water resources from polluted runoff. Livestock can be encouraged to loaf away from streams by relocating feed and shelter. Moving feed bunks is easily accomplised, but providing immediate alternate shelter is more difficult. Several years are required to establish new windbreaks. An intermediate form of alternate shelter suitable for several types of livestock is needed that will provide protection from wind in the winter, shade in the summer, and enhance general livestock management. This invention provides a prefabricated modular portable livestock shelter.

2. Description of Prior Art

In addition to providing protection from adverse elements, portable livestock shelters historically have been designed to increase livestock producer's management options. While early designs provided opportunities for enhanced manure and pasture management resulting in increased animal health, the scope of their application was restricted. U.S. Pat. No. 68,937 to Baker and Hisher (1867), U.S. Pat. No. 74,411 to Norris (1868), and Robbins (1884), were designed specifically for sheep, while U.S. Pat. No. 142,069 to Yeiser (1873), U.S. Pat. No. 176,677 to Patterson (1875), and U.S. Pat. No. 624,330 to Heaton (1898) were designed for cattle. All these designs provided winter protection from wind, but did not have the flexibility of providing summer shade while allowing beneficial breeze to pass through the structure. In addition, all of the designs were constructed primarily with wood, which is susceptible to deterioration.

Subsequent designs continue to have a narrow scope of application. U.S. Pat. No. 1,743,603 to Heizenreter (1928), U.S. Pat. No. 1,823,940 to Hoegermeyer (1929), and U.S. Pat. No. 2,712,677 to Hyde (1955) were designed specifically for hogs. U.S. Pat. No. 3,023,732 to Everett (1959) was designed for hogs or sheep, but only provides shade for summer. U.S. Pat. No. 3,556,054 to Honegger, Stevenson, and Newtson (1971) contains a waste collection system with aeration and ventilation to eliminate vapor. This feature is an additional expense not required by some producers. Disposal of collected waste is an additional maintenance cost as well. The structure is also complicated to assemble. U.S. Pat. No. 3,724,424 to Benjamin (1973) was designed primarily for enclosing hogs. U.S. Pat. No. 3,885,524 to Gregory (1975) provides winter shelter, but does not allow breeze to pass through the structure if used for summer shade. U.S. Pat. No. 4,322,925 to Geisler (1982) provides containment and shade for animals, but no winter protection. U.S. Pat. No. 4,372,251 to Keith (1983) and U.S. Pat. No. 4,508,060 to Schulte (1985) were designed for sheltering calves. U.S. Pat. No. 4,991,895 to Artbo (1991) provides winter protection from wind, but does not allow beneficial exposure to sun.

The need exists for a portable livestock shelter with a wide scope of application in terms of providing year round protection for a variety of livestock while allowing producers maximum management flexibility.

OBJECTS AND ADVANTAGES

Accordingly, several objects and advantages of the present invention are:

(a) to provide a portable livestock shelter with a prefabricated design that can easily be assembled by the producer on site, thus reducing shipping costs.

(b) to provide a portable livestock shelter with a modular design that can easily be expanded according to a producer's need and budget.

(c) to provide a portable livestock shelter that can easily be transported intact within a field or easily disassembled to move from one location to another.

(d) to provide a portable livestock shelter with a winter configuration to provide protection from wind while allowing beneficial exposure to sun.

(e) to provide a portable livestock shelter with a summer configuration to provide shade from the sun while allowing beneficial breeze to pass through the structure.

(f) to provide a portable livestock shelter constructed with materials that will not readily decompose, thus reducing maintenance costs.

(g) to provide a portable livestock shelter that can accommodate cattle, horses, and sheep, but easily modified for calves and possibly hogs.

Further objects and advantages of the invention will become apparent from a consideration of the drawings and ensuing description.

Figure 1:
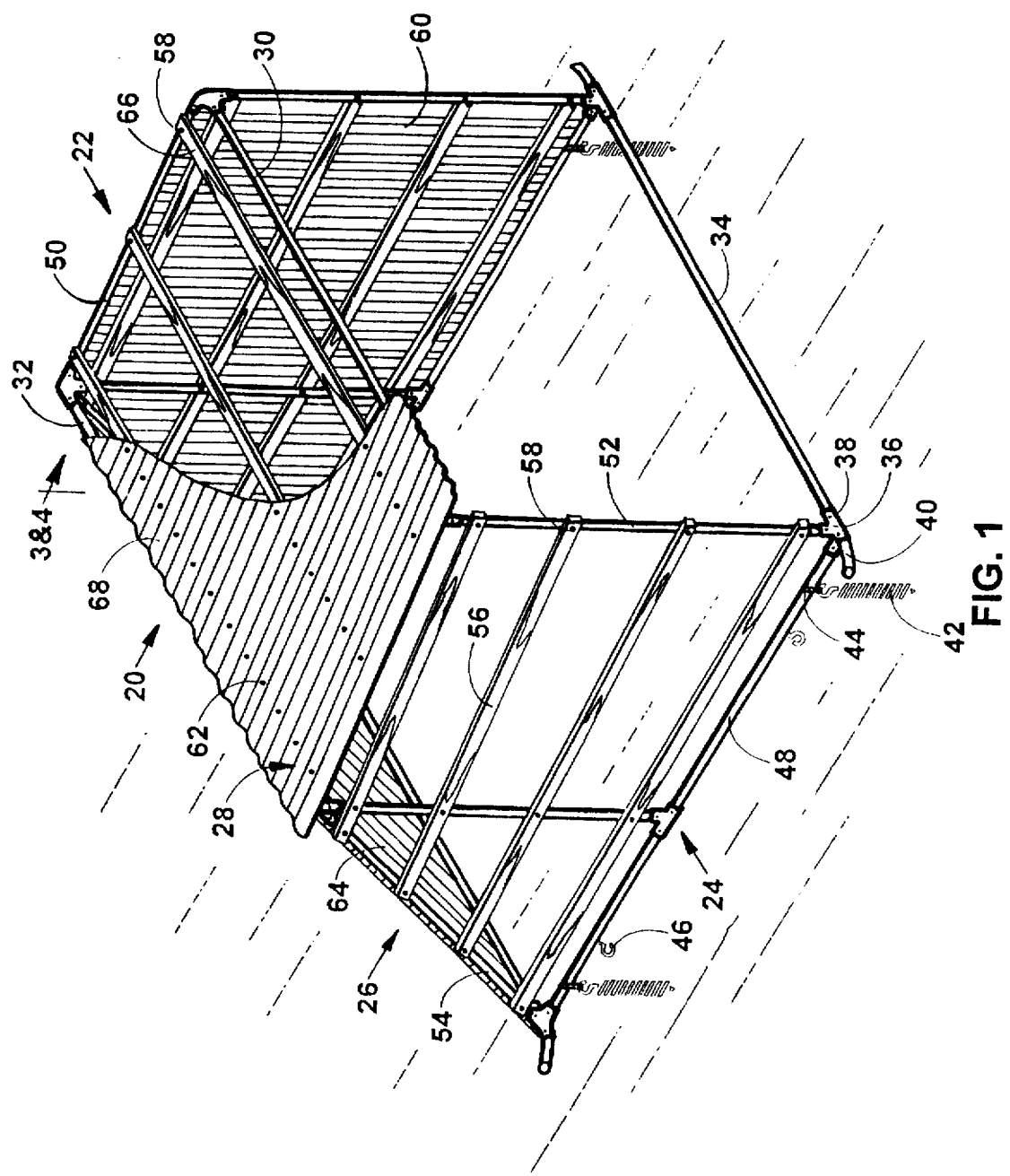
FIG. 1 is a perspective view of one modular unit with a portion of the roof broken away and one end panel removed in order to fully view the frame.

| Reference Numerals In Drawings | |
|---|---|
| 20 | portable livestock shelter |
| 22 | end wall |
| 24 | end wall |
| 26 | side wall |
| 28 | roof |
| 30 | front tubular side rail |
| 32 | back tubular side rail |
| 34 | tubular skid |
| 36 | tubular connector |
| 38 | connector fastener |
| 40 | tubular upturned end |
| 42 | metal earth anchor |
| 44 | steel cable and clamp |
| 46 | metallic hook |
| 48 | tubular bottom end rail |
| 49 | tubular bottom middle rail |

-continued

| Reference Numerals In Drawings | |
|---|---|
| 50 | tubular top end rail |
| 51 | tubular top middle rail |
| 52 | tubular post |
| 54 | angled tubular member |
| 56 | wooden side support member |
| 58 | wooden support fastener |
| 60 | corrugated metallic end |
| 62 | metallic fastener |
| 64 | corrugated metallic side |
| 66 | wooden top support member |
| 68 | corrugated metallic roof |
| 70 | tubular side wall frame |
| 72 | tubular sleeve with hinge |
| 74 | tubular sleeve hinge pin |
| 76 | tubular arm |
| 78 | tubular arm hinge |
| 80 | tubular arm hinge pin |
| 82 | tubular arm fastener |
| 84 | side wall lock |
| 86 | side wall lock fastener |

DETAILED DESCRIPTION OF THE INVENTION

Figure 2:
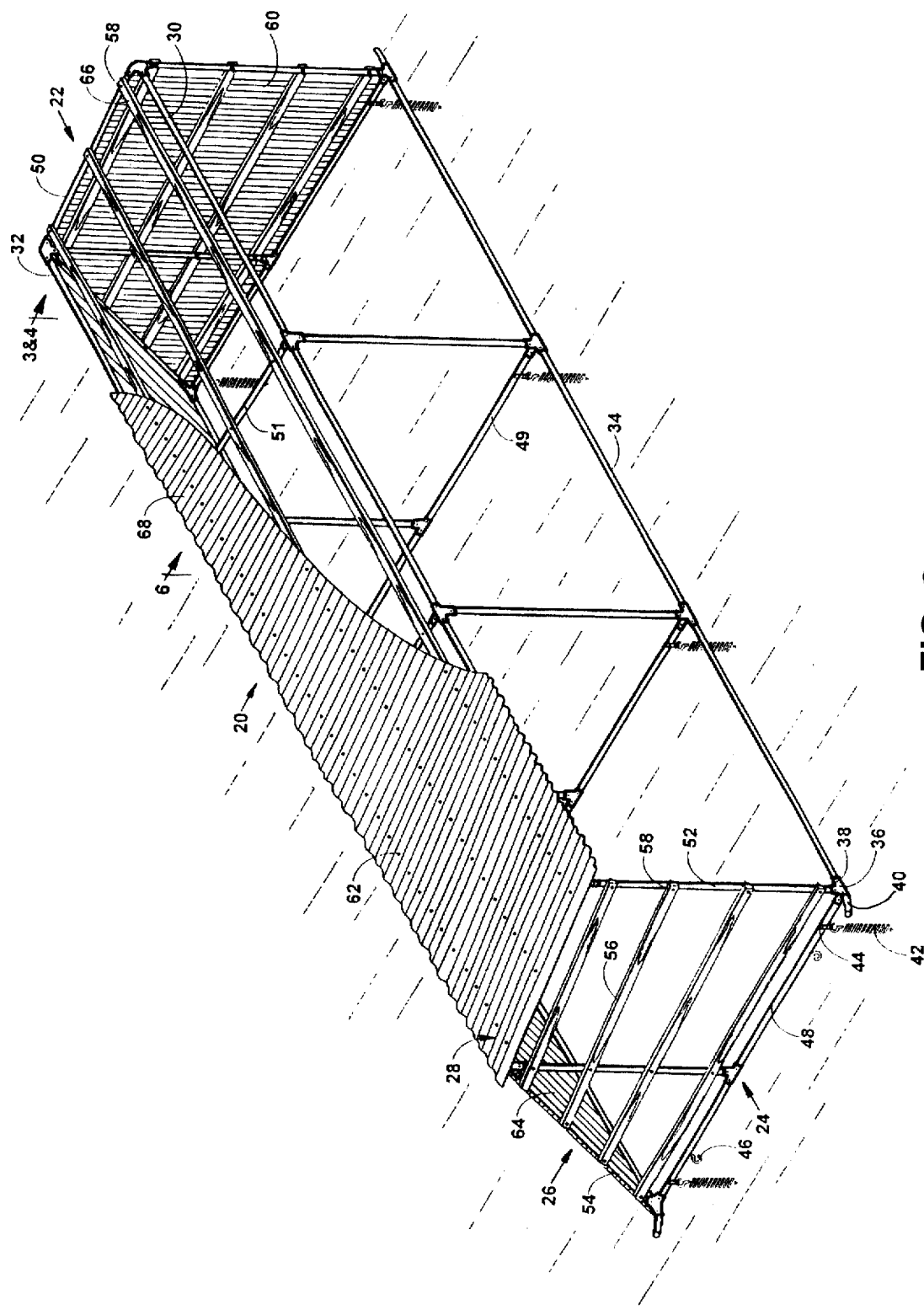
FIG. 2 is a perspective view of multiple modular units with a portion of the roof broken away and one end panel removed in order to fully view the frame.

In FIGS. 1 and 2, the portable livestock shelter is designated by general reference numeral 20. The prefabricated modular structure in FIGS. 1 and 2 is comprised of a pair of end walls 22 and 24 attached to a side wall 26. In addition, a roof 28 is attached to the end walls 22 and 24, as well as the side wall 26. The end walls 22 and 24 are connected by a from tubular side rail 30, a back tubular side rail 32, and a pair of tubular skids 34 by multiple tubular connectors 36 and connector fasteners 38. Upturned ends 40 allow the shelter to slide easily over the surface of the ground. The shelter is secured by placing metal earth anchors 42 into the ground and fastening them to the shelter with a steel cable and clamp 44. A tractor or other suitable farm vehicle may fasten a chain to the metallic hooks 46 in order to drag the portable livestock shelter 20 over the ground to facilitate pasture, manure, and disease management.

Each of the end walls 22 and 24 consist of a tubular bottom end rail 48, a tubular top end rail 50, a pair of tubular posts 52, and an angled tubular member 54 connected with multiple tubular connectors 36 and connector fasteners 38. Multiple wooden side support members 56 are fastened to the tubular posts 52 and angled tubular member 54 with a wooden support fastener 58. A corrugated metallic end 60 is detachably fastened to the wooden side support member 56 with a metallic fastener 62. A corrugated metallic side 64 is detachably attached to the back tubular side rail 32 in a manner to be later described. In FIG. 2, a tubular bottom middle rail 49, a tubular top middle rail 51, and multiple tubular posts 52 are connected with multiple tubular connectors 36 and connector fasteners 38 in order to allow multiple modular units to be attached.

The roof 28 consists of multiple wooden top support members 66 fastened to the tubular top end rails 50 and tubular top middle rails 51 with a wooden support fastener 58. A corrugated metallic roof 68 is detachably fastened to multiple wooden top support members 66 with a metallic fastener 62.

Figure 3:
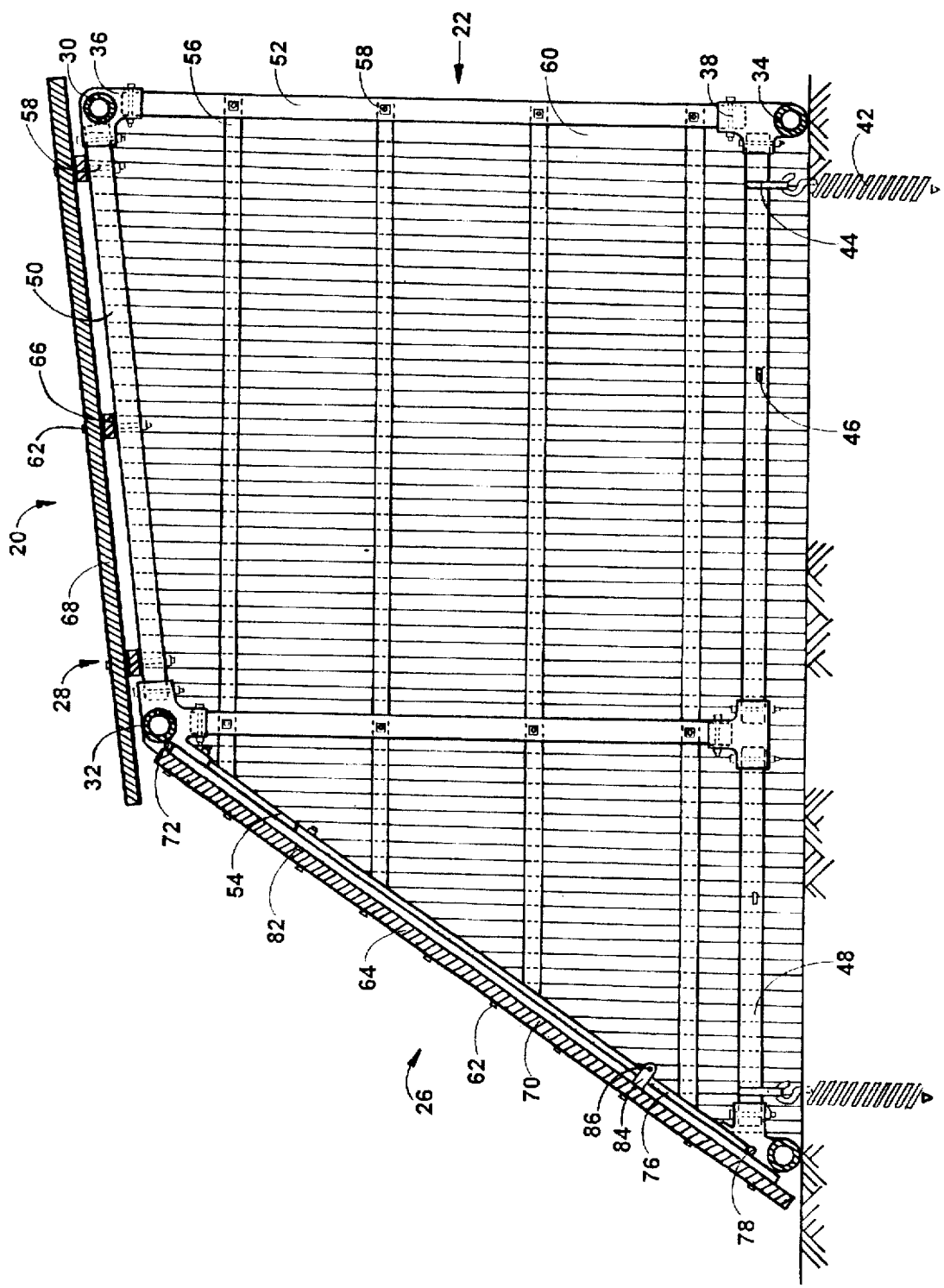
FIG. 3 is a section of the winter configuration of the portable livestock shelter.
Figure 4:
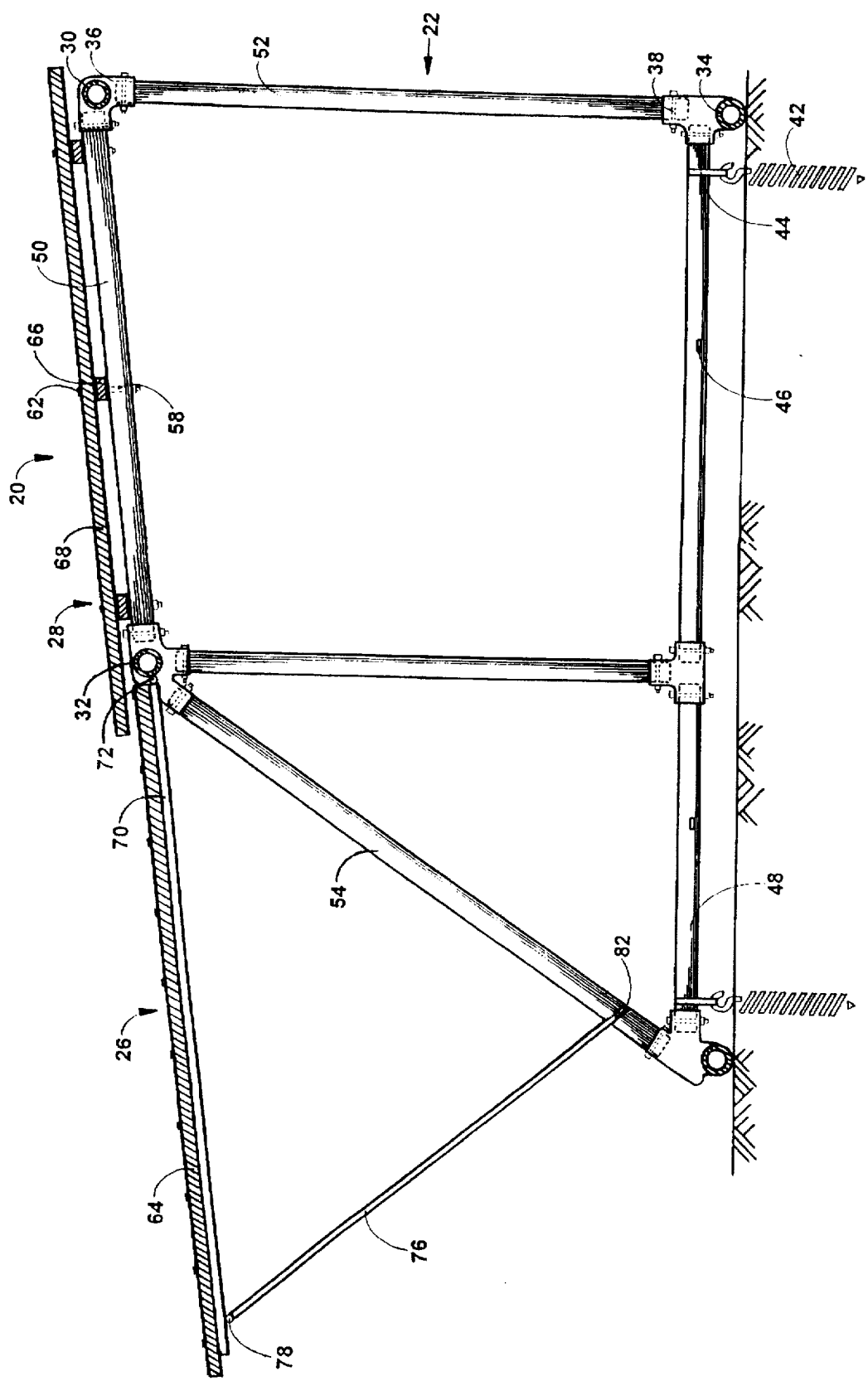
FIG. 4 is a section of the summer configuration of the portable livestock shelter.

FIGS. 3 and 4, represent sectional views of the winter and summer configurations respectively of the portable livestock shelter 20. In FIG. 3, the winter configuration provides shelter from wind with a side wall 26 that consists of a side wall frame 70 covered with a corrugated metallic side 64 that is secured with a metallic fastener 62. The side wall 26 is attached to the back tubular side rail 32 by means of a tubular sleeve with a hinge 72 that is secured with a tubular sleeve hinge pin 74 (shown in FIG. 7) to allow raising and lowering. Livestock are prevented from pushing the side wall 26 out by a side wall lock 84 and side wall lock fastener 86. Additional protection from inclement weather is provided by a roof 28 that consists of a series of wooden top support members 66 placed in a perpendicular fashion to the tubular top end rails 50 and tubular top middle rails 51 and secured with multiple wooden support fasteners 58. A corrugated metallic roof 68 is detachably attached to the wooden top support members 66 with multiple metallic fasteners. In FIG. 4, the summer configuration provides additional shade by raising the side wall 26 with a tubular arm 76 attached to the side wall frame 70 with a tubular arm hinge 78 and tubular arm hinge pin 80 (shown in FIG. 7). The tubular arm 76 is secured in a raised position with a tubular arm fastener 82 attached through the angular tubular member 54.

Figure 5:
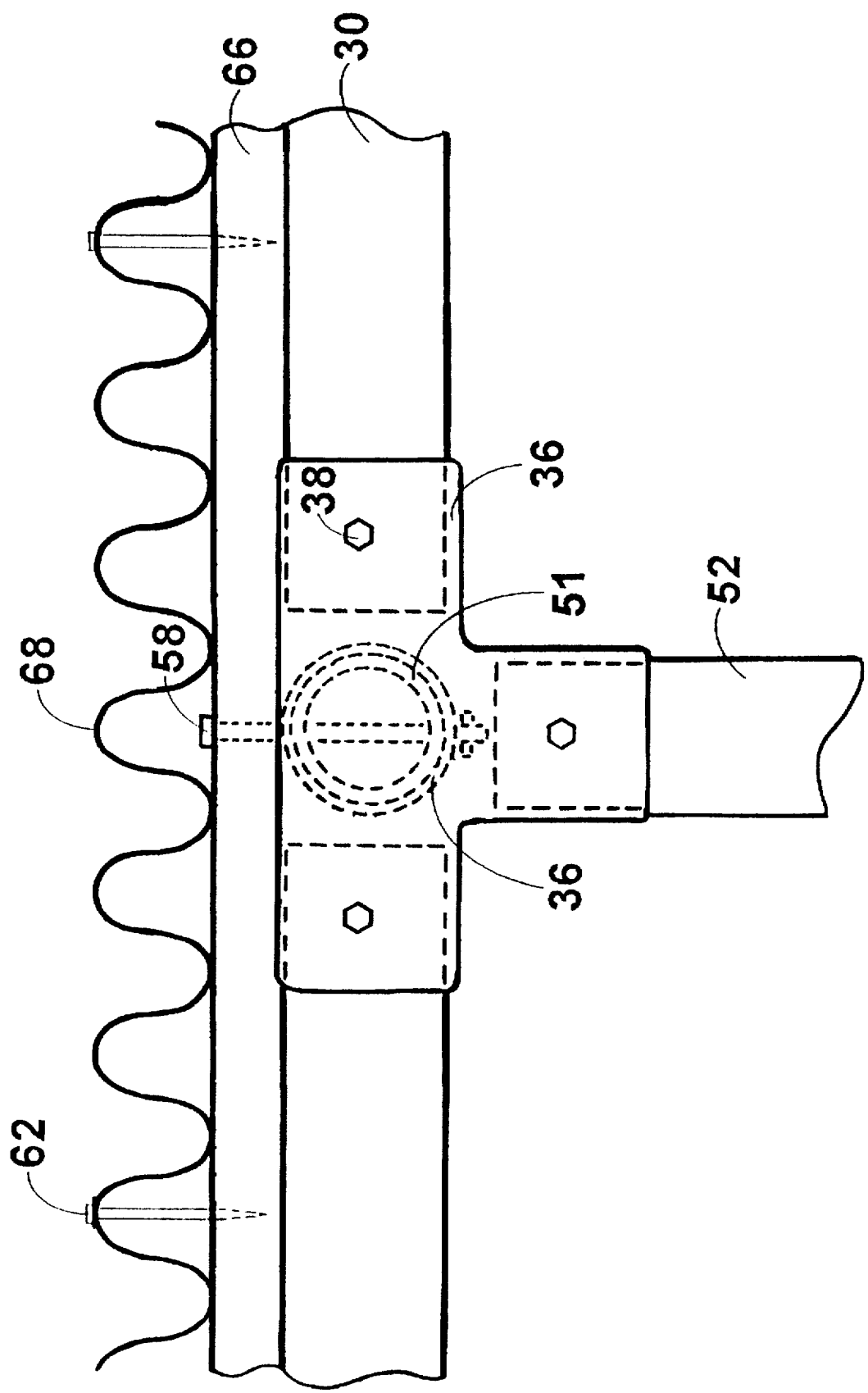
FIG. 5 is a front view of a top front connector assembly used to attach multiple modular units.
Figure 6:
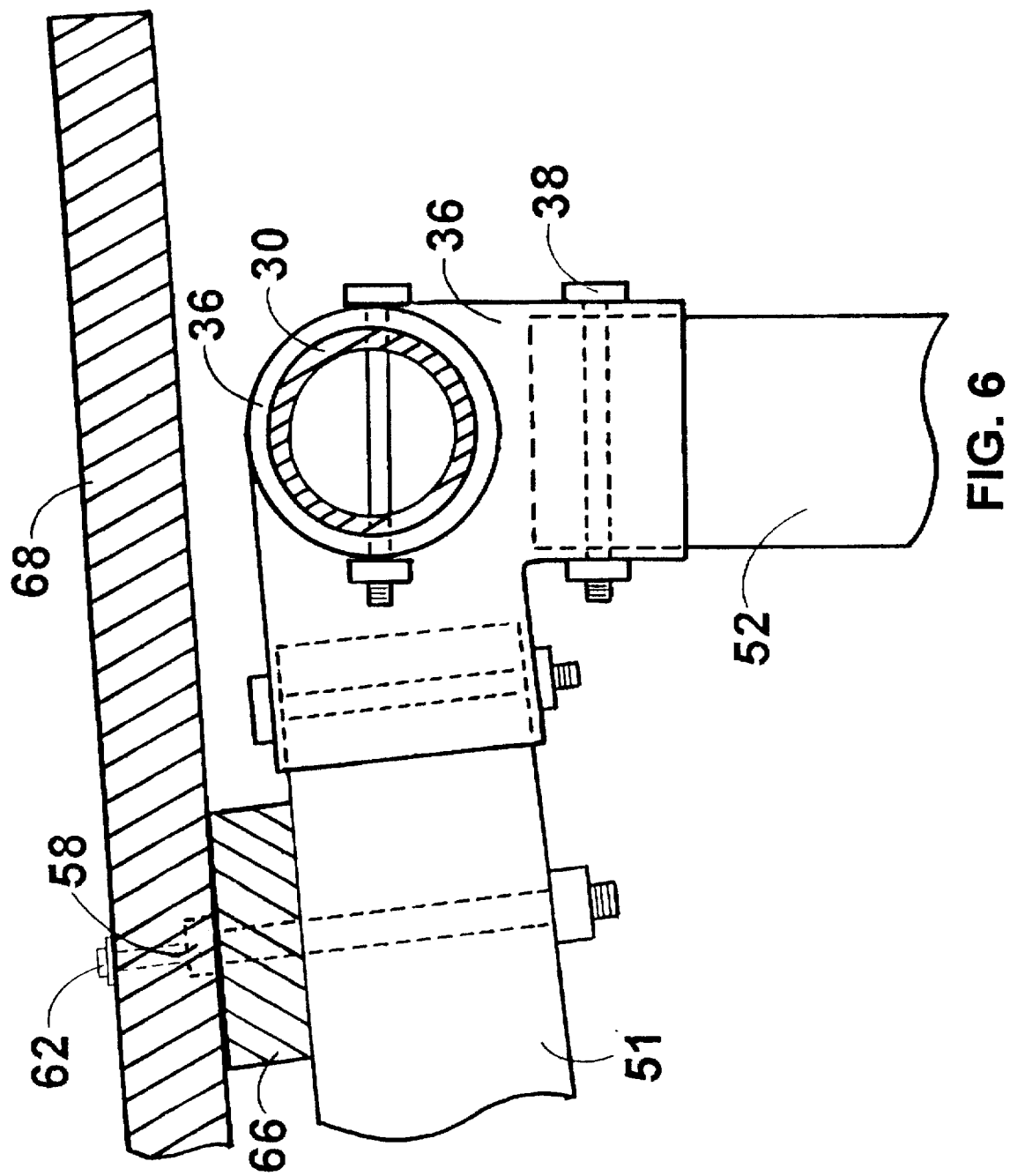
FIG. 6 is a section of a top front connector assembly used to attach multiple modular units.

FIGS. 5 and 6 are details of connector assemblies. While five different configurations of connector assemblies are used to construct one modular unit of the portable livestock shelter 20, only one configuration is illustrated since the others are constructed and operate in a similar fashion. Six different ear assembly configurations are used to attach multiple modular units. FIG. 5 is a front view of a top front connector assembly used to attach multiple modular units. FIG. 6 is a section of a top front connector assembly used to attach multiple modular units. A front tubular side rail 30, a tubular top middle rail 51, and a tubular post 52 are inserted into a tubular connector 36 and secured with connector fasteners 38. A series of wooden top support members 66 are placed in a perpendicular fashion to the tubular top middle rail 51 and fastened with wooden support fasteners 58. A corrugated metallic roof 68 is attached to the wooden top support members 66 with multiple metallic fasteners 62.

Figure 7:
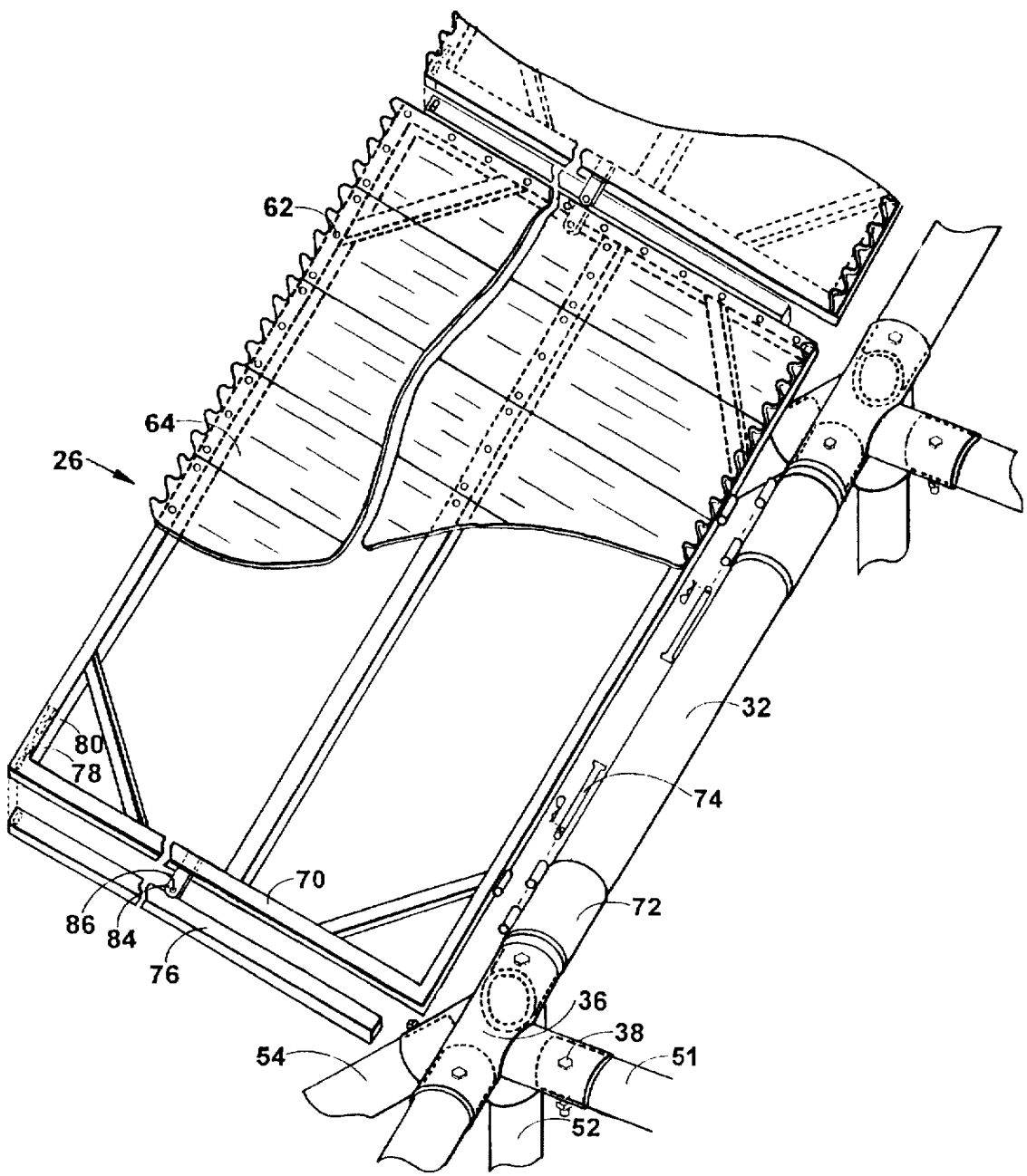
FIG. 7 is a perspective view of a typical hinge assembly connecting the side of the portable livestock shelter to the frame.

FIG. 7 is a perspective view of how the side wall 26 is connected to the back tubular side rail 32. A tubular side wall frame 70 is attached to a pair of tubular sleeves with hinges 72 and secured with a tubular sleeve hinge pin 74. A tubular arm 76 is attached to the tubular side wall frame 70 with a tubular arm hinge 78 and tubular arm hinge pin 80 for securing the side wall 26 in a raised position in the summer. The corrugated metallic side is detachably fastened to the tubular side wall frame 70 with metallic fasteners 62. A side wall lock 84 and side wall lock fastener 86 prevent livestock from pushing out the side wall 26 in winter.

OPERATION OF INVENTION

The portable livestock shelter 20 consists of a modular unit as shown in FIG. 1. Multiple units can be added as shown in FIG. 2. After disposing the shelter 20 in a desirable location, it is secured in place with multiple earth anchors 42 in conjunction with steel cables and clamps 44. One side of the shelter 20 is open to allow livestock access in and out of the structure. For winter configuration, the side wall 26 is placed in a manner illustrated in FIG. 3. A side wall lock 84 on both ends of the tubular side wall frame 70 secures the side wall 26 in the lowered position by placing a side wall lock fastener 86 through adjoining side walls 26 as illustrated in FIG. 7. For summer configuration, the side wall 26 is placed in a manner illustrated in FIG. 4. A tubular arm 76 is used to raise the side wall 26 in a horizontal position and is secured into place with a tubular arm fastener 82 placed through the angled tubular member 54. The shelter 20 is rendered mobile by a pair of tubular skids 34 and upturned tubular ends 40 which are joined by tubular connectors 36 and secured with connector fasteners 38 as illustrated in FIG. 1. Metallic hooks 46 allow a chain to be attached so the shelter 20 can be transported short distances. The shelter 20 can also be disassembled to be transported long distances.

CONCLUSION, RAMIFICATIONS, AND SCOPE OF INVENTION

It should now become obvious that the objects and advantages of the invention have been accomplished by the new and novel structure herein described. Nevertheless, the foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to. The scope of the invention should be determined not by the embodiments illustrated, but by the appended claims and their legal equivalents.

We claim:

1. A prefabricated modular portable livestock shelter comprising:
   a. a pair of spaced apart parallel ground engaging skids;
   b. a pair of oppositely placed end walls extending upwardly and detachably connected to said ground skids;
   c. towing means connected to said side walls for purposes of transporting said shelter from one location to another;
   d. a pair of spaced apart parallel side rails detachably connected to said end walls;
   e. a side wall detachably connected to said side rail;
   f. multiple side wall locks attached to said side wall;
   g. multiple tubular arms detachably connected to said side wall;
   h. a roof detachably connected to said end walls;
   i. said structure having an open side for free ingress and egress of livestock disposed between said end walls and said side wall and said roof and the underlying ground surface.
   j. multiple pairs of middle rails detachably connected in a perpendicular fashion to said skids and side rails and roof for assembling multiple shelters together;
   k. multiple posts detachably connected to said skids and extending upwardly to and detachably connected to said side rails and middle rails;
   l. multiple hinged sleeves removedly enveloping said side rail and detachably attached to said side wall;
   m. multiple earth anchors detachably fastened to said end walls and middle rails and secured into the ground;
   n. multiple tubular arms detachably attached to said side wall;
   o. multiple tubular connectors detachably attached to said skids, end walls, side rails, middle rails and posts;
   p. multiple fasteners received in said tubular connectors for detachably connecting said skids, end walls, side rails, middle rails and posts, said fasteners being of sufficient length to extend through said tubular connectors;
   q. multiple fasteners for detachably connecting said roof to said end walls and middle rails; said fasteners being of sufficient length to extend through said end walls and middle rails;
   r. multiple fasteners received in said side wall locks.

2. The portable livestock shelter as defined in claim 1 wherein said hinged sleeve removedly enveloping said side rail and detachably connected to said side wall further provides pivotal movement about the horizontal axis of said side rail in a downward fashion to secure said side wall in a closed position with said side wall lock and fastener.

3. The portable livestock shelter as defined in claim 1 wherein said hinged sleeve removedly enveloping said side rail and detachably connected to said side wall further provides pivotal movement about the horizontal axis of said side rail in an upward fashion wherein said side wall is secured in a raised position with said tubular arm and fastener.

* * * * *